United States Patent
Helms

(10) Patent No.: US 6,523,713 B1
(45) Date of Patent: Feb. 25, 2003

(54) STACKABLE HINGED CONTAINER LID HAVING DETENTS

(75) Inventor: Charles R. Helms, Earleville, MD (US)

(73) Assignee: Double "H" Plastics, Inc., Warminster, PA (US)

(*) Notice: Subject to any disclaimer, the term of this patent is extended or adjusted under 35 U.S.C. 154(b) by 175 days.

(21) Appl. No.: 09/735,824

(22) Filed: Dec. 13, 2000

Related U.S. Application Data

(60) Provisional application No. 60/170,549, filed on Dec. 14, 1999.

(51) Int. Cl.[7] ............................................. B65D 43/24
(52) U.S. Cl. .................... 220/831; 220/847; 220/359.3; 220/359.1; 220/380; 220/780; 220/258; 220/832; 229/123.3
(58) Field of Search ...................... 229/125.01, 125.08, 229/125.19, 125.35, 123.33, 125.05; 220/824, 815, 834, 832, 835, 831, 359.1, 268, 826, 359.3, 256, 258, 837, 780, 781, 380, 847; 206/508

(56) References Cited

U.S. PATENT DOCUMENTS

| | | | |
|---|---|---|---|
| 2,434,756 A | * 1/1948 | Brooks | 229/125.08 X |
| 2,893,456 A | 7/1959 | Wallace | |
| 3,167,104 A | * 1/1965 | Wiley et al. | |
| 3,262,606 A | * 7/1966 | Waterman | 222/480 |
| 3,412,890 A | * 11/1968 | Rich | |
| 3,417,897 A | * 12/1968 | Johnson | 220/832 X |
| 3,421,654 A | * 1/1969 | Hexel | |
| 3,892,351 A | 7/1975 | Johnson et al. | |
| 3,893,566 A | * 7/1975 | Ross | 229/125.35 X |
| 3,899,079 A | 8/1975 | Seiter | |
| 3,904,074 A | * 9/1975 | Hoffman et al. | 220/258 X |
| 3,934,749 A | 1/1976 | Andrulionis | |
| 3,956,550 A | * 5/1976 | Sutch | |
| 4,044,941 A | 8/1977 | Knudesen | |
| 4,094,460 A | 6/1978 | Scanga et al. | |
| 4,328,905 A | * 5/1982 | Hardt | 220/258 |
| 4,358,025 A | * 11/1982 | Urion | 220/258 |
| 4,401,231 A | 8/1983 | Helms | |
| 4,418,834 A | 12/1983 | Helms et al. | |
| 4,438,864 A | * 3/1984 | Helms | |
| 4,442,971 A | 4/1984 | Helms | |
| 4,448,345 A | 5/1984 | Helms | |
| 4,449,628 A | * 5/1984 | Egly et al. | 220/832 X |
| 4,579,246 A | * 4/1986 | Swearingen et al. | 220/258 |
| 4,583,679 A | * 4/1986 | Johnson | 220/258 X |
| 4,692,132 A | 9/1987 | Ikushima et al. | |
| 4,768,703 A | * 9/1988 | Sosler et al. | |
| 5,064,088 A | * 11/1991 | Steffes | |
| 5,358,130 A | * 10/1994 | Mengeu et al. | 215/235 X |
| 5,697,509 A | * 12/1997 | Hayes | 215/235 |
| 5,791,508 A | * 8/1998 | Arnould | 220/254 |
| 5,979,748 A | 11/1999 | Drummond et al. | |
| 6,053,353 A | * 4/2000 | Helms | 229/125.19 X |
| 6,119,890 A | * 9/2000 | Kawamata | |
| 6,196,451 B1 | * 3/2001 | Helms | |

* cited by examiner

*Primary Examiner*—Lee Young
*Assistant Examiner*—Robin A Hylton
(74) *Attorney, Agent, or Firm*—Synnestvedt & Lechner LLP

(57) ABSTRACT

A lid and a container using the lid are disclosed, the lid having a central panel of paperboard with a resilient plastic skirt joined about its perimeter. A metal foil membrane having heat activated adhesive layers is attached to the lid and the rim of the container by inductive heating. Detents project from an inside surface of the skirt and cooperate with the rim on the container to hold the lid in an open position. A stacking lip extends from the skirt and interfits within an identical lid to allow the lids to be stacked for shipment. A hinge extends transversely across the central panel and divides the lid into movable and fixed portions. Weakened regions on the skirt separate when the lid is opened and provide evidence of potential tampering.

19 Claims, 9 Drawing Sheets

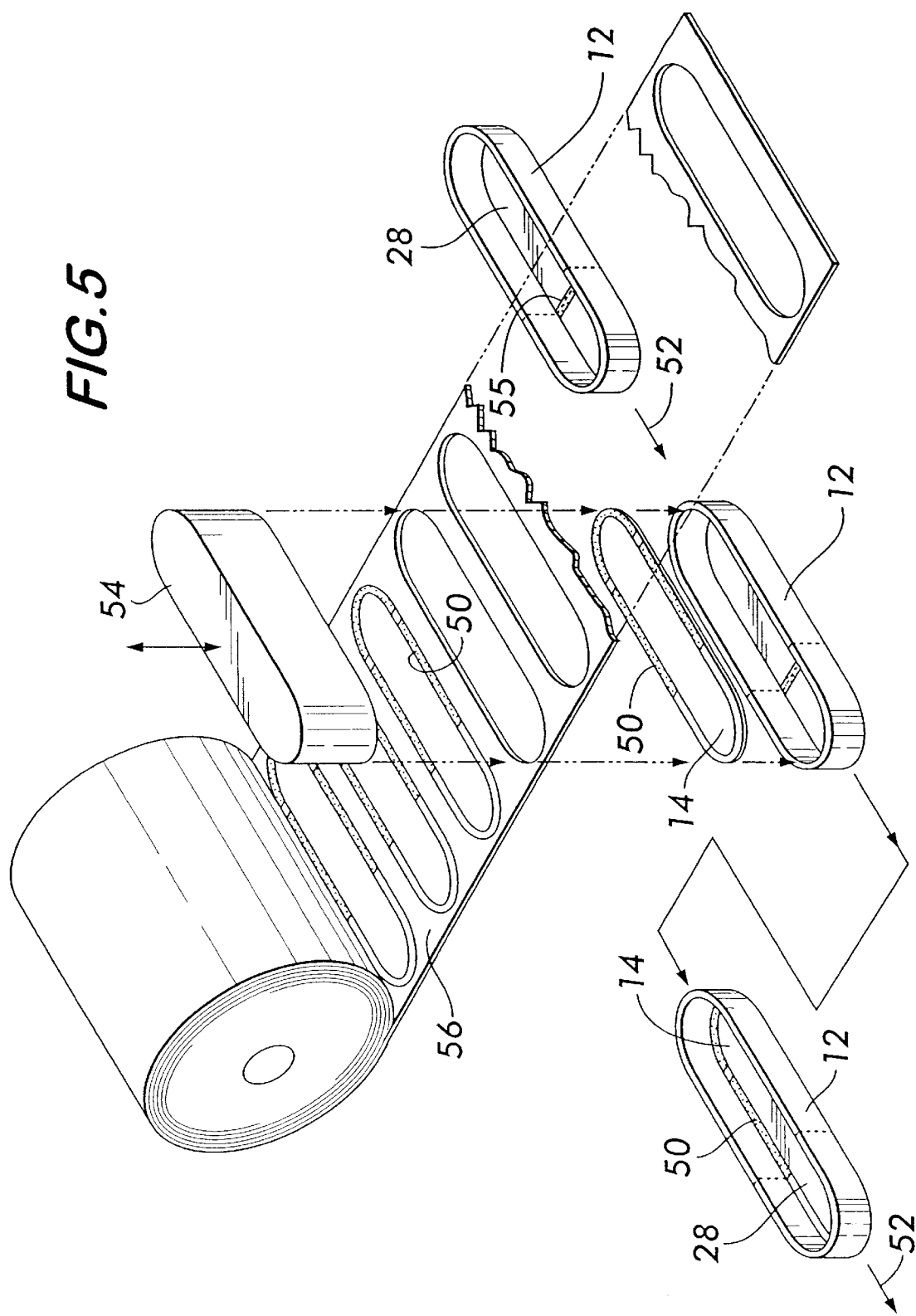

STACKABLE HINGED CONTAINER LID HAVING DETENTS

CROSS REFERENCE TO RELATED APPLICATION

This application is based on and claims the benefit of prior filed co-pending provisional Application No. 60/170,549, filed Dec. 14, 1999.

FIELD OF THE INVENTION

This invention relates to container lids attachable to tubular containers by means of induction heating, the lids also being stackable one atop another prior to use.

BACKGROUND OF THE INVENTION

Tubular containers find use throughout the packaging industry and provide a robust container useful in a broad range of applications to hold a wide variety of bulk goods including foodstuffs, hardware and chemicals to cite only a few examples.

It is often desirable that the container have a lid construction which initially provides a hermetic seal for the container, the seal preventing air and moisture from entering the container and adversely affecting its contents. This feature is especially important for food stuffs, such as cereals, which must remain fresh between the time of packaging and purchase by the consumer.

It is also advantageous that the lid have a readily visible feature which provides a permanent indication once the lid has been opened. This "tamper evident feature" permits consumers to judge at a glance whether the integrity of the container has been violated and not purchase the item.

The lid should also be reclosable, enabling the container to provide convenient storage of the bulk goods, extending their shelf life and preventing inadvertent spills of the container contents. For convenience of dispensing its contents, the lid should also have a means for holding the lid in an open position until it is desired to reclose it.

The lid should also be inexpensive to produce and must attach permanently to the container if tubular containers are to be commercially acceptable with other packaging such as rectangular paperboard boxes. Traditionally, hot-melt adhesives have been used to attach such a lid to the tubular container, but a lid which obviates the use of such adhesives is desirable for several reasons. First, the costs of the adhesive and the machinery needed to apply it increase the costs of such packages to such an extent as to make their use on a large scale economically unfeasible. Second, it is also disadvantageous to fill the container and then secure the lid with hot melt adhesive due to the potential for contamination of the container contents with the adhesive or spillage of the contents onto the machinery applying the hot melt.

The lid for a tubular container should also be easy to handle by automated machinery for assembly of the container. The lid should be reliably stackable to permit large numbers to be shipped efficiently and loaded into the processing machines for assembly of the container.

There is clearly a need for a reclosable lid for tubular containers which can provide a hermetic seal, a tamper-evident feature, be permanently attached and yet be inexpensive enough to allow tubular containers to compete economically with other forms of packaging.

SUMMARY AND OBJECTS OF THE INVENTION

The invention concerns a lid for a container having a sidewall with a rim defining an opening into the container. The lid is engageable with the rim to close the opening. In its preferred embodiment, the lid comprises a central panel having an outer perimeter and a hinge extending transversely across the central panel and dividing the lid into two lid portions. One lid portion is pivotably movable about the hinge relatively to the other lid portion.

The lid also has a resilient, flexible skirt joined to its perimeter, the skirt extending substantially perpendicularly to the plane of the central panel. The skirt has an inside surface which is positionable to face the container sidewall adjacent to the rim and a pair of weakened regions arranged on opposite sides of the lid. The weakened regions are aligned with the hinge and are subject to failure to facilitate separation of the skirt at the hinge when the one lid portion is pivoted relatively to the other lid portion. Preferred material for the central panel is paperboard and plastic resin for the lid.

A detent projects substantially perpendicularly from the inside surface of the skirt on the one lid portion. Preferably, the detent is positioned adjacent to one of the weakened regions. The detent is resiliently biasable into engagement with the rim by the skirt, and when the lid is engaged with the rim, the detent cooperates with the rim to hold the one lid portion in a pivoted position relatively to the other lid portion, thereby exposing the opening in the container.

Preferably, the lid has a stacking lip making the lid stackable with another substantially identical lid. The stacking lip is joined to the perimeter of the central panel and extends substantially perpendicularly to the plane of the central panel away from the skirt. The lip is engageable with an inside surface of a skirt on the other substantially identical lid for stacking the lids one atop the other. The lip has a notch aligned with the hinge and sized to receive a detent on the other substantially identical lid. Preferably, the stacking lip is formed integrally with the skirt.

For facilitating pivoting of the one lid portion relatively to the other, the lid has two elongated cuts through the central panel. The cuts are positioned coincident with and along the hinge adjacent to a respective weakened region. The lid also has two elongated tabs, each one being attached to the central panel and covering one of the elongated cuts for sealing the central panel. Preferably, the elongated tabs are integrally formed with the skirt.

To provide a hermetic seal to the container, the lid has a membrane overlying the central panel adjacent to the inside surface of the skirt. The membrane is positionable in overlying registration with the opening and attachable to the rim for sealing the container opening.

Preferably, the membrane is a metal foil which allows it to be attached to the container by a heat activated adhesive and an induction heating process. The membrane has a first heat activated adhesive layer on a first side thereof, the first side being positionable to face the rim. The first adhesive layer is engageable with the rim to attach the membrane to the rim and thereby enclose the opening when the lid is engaged with the rim.

A second heat activated adhesive layer is positioned on a second side of the membrane opposite to the first side. The second adhesive layer is positioned to engage the other lid portion for attaching the lid to the rim when the lid is engaged with the rim.

The invention also contemplates a container and a lid as described above. The container has a sidewall defining an interior space and an opening providing access to the space. A rim surrounds the opening and the lid is engaged with the rim in overlying registration with the opening.

The container is sealed by a membrane positioned between the lid and the rim, the membrane being in overlying registration with the opening and attached to the rim, thereby sealing the opening.

Attachment of the membrane is preferably via a first adhesive layer positioned between the membrane and the rim. To attach the lid to the container, a second adhesive layer is positioned between the membrane and the other lid portion.

It is an object of the invention to provide a lid for a tubular container which is easily openable and reclosable.

It is another object of the invention to provide a lid which will remain opened for convenience of dispensing the container contents.

It is still another object of the invention to provide a lid which has a readily visible tamper evident feature.

It is yet another object of the invention to provide a lid which can effect an initial hermetic seal of the container.

It is again another object of the invention to provide a lid which may be attached to the container by induction heating means and avoid the use of liquid hot melt adhesives.

It is yet again another object of the invention to provide a lid which is stackable with substantially identical lids.

It is still another object of the invention to provide a lid which can be handled by automated equipment to assemble a container.

It is furthermore an object of the invention to provide a lid which will improve the economic feasibility of tubular containers.

These as well as other objects and advantages of the invention will become apparent from consideration of the following drawings and detailed description of the preferred embodiment.

BRIEF DESCRIPTION OF THE DRAWINGS

FIG. 5 is a perspective view of a machine used to manufacture lids according to the invention;

DETAILED DESCRIPTION OF A PRESENTLY PREFERRED EMBODIMENT

Figure 1:
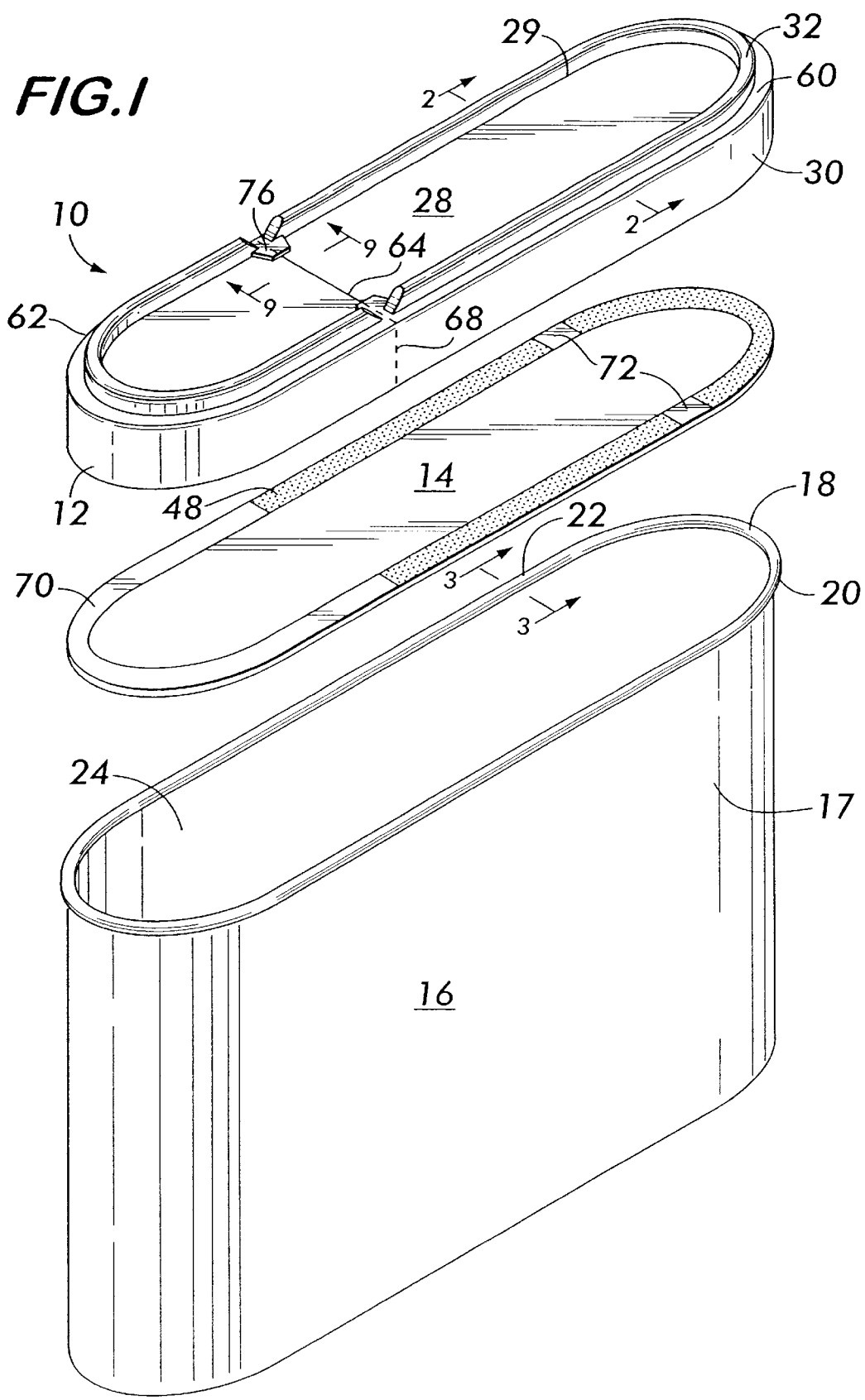
FIG. 1 shows an exploded perspective view of a container having a lid according to the invention.

FIG. 1 shows an exploded view of a three part container assembly 10 including a lid 12, a membrane 14 and a tubular container 16 according to the invention. Membrane 14, preferably made of a metal foil as explained below, fits on top of container 16 and is sealingly and continuously attached around its rim 18. Preferably rim 18 comprises a rolled edge 20 formed by rolling the container sidewall 17 outwardly to form an enlarged contact area 22 surrounding the opening 24 of the container 16. Contact area 22 facilitates the formation of a robust hermetic seal between the membrane and the container required to preserve the freshness of the contents and provide extended shelf life.

Figure 2:
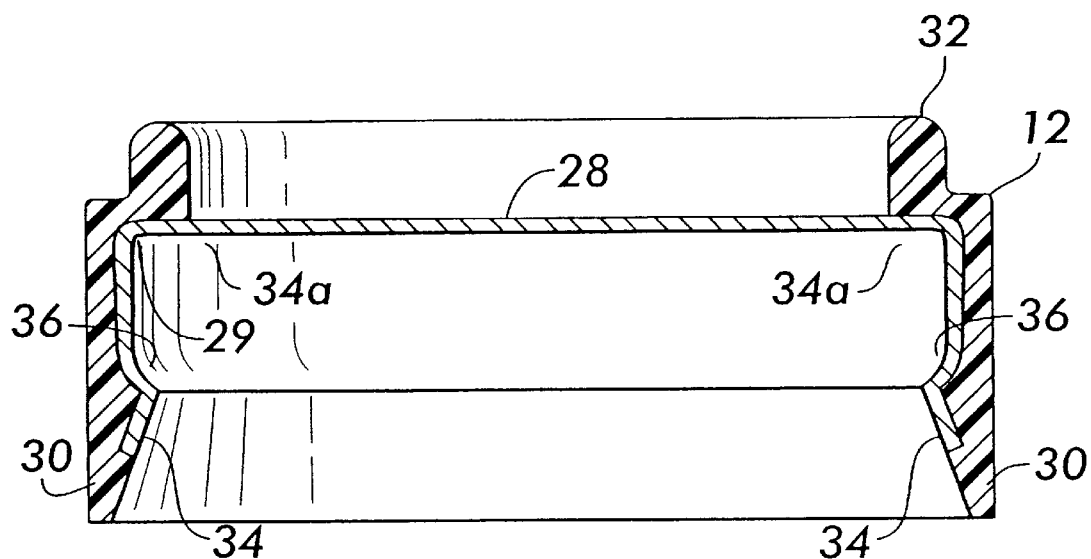
FIG. 2 is a cross-sectional view taken along line 2—2 of FIG. 1.

Lid 12 fits over the membrane 14 and the rolled edge 20 and is attached to the container 16 as described in detail below. Lid 12 is preferably a composite construction of coated paperboard and plastic resin. FIG. 2 shows a cross-sectional view of a preferred embodiment of the lid comprising a paperboard central panel 28 having a perimeter 29 to which a resilient plastic skirt 30 is joined. The central panel 28 provides a surface for the printing of high quality graphics on the lid, allowing trademarks, brand names and other illustrations important for considerations of brand recognition to be displayed. The plastic skirt 30 provides a tough, resilient framing hoop, reinforcing and stiffening the lid and container.

Lid 12 has a stacking lip 32 (see FIG. 2) preferably integrally molded with skirt 30 and extending upwardly around the top of the lid. Lip 32 is sized and shaped to interfit within an identical lid 88 (see FIG. 12) and engage an inside surface 34 of the skirt 30, thus, allowing the lids to be conveniently stacked one above another for shipment without shifting laterally. The inside surface 34 of lid 12 has an indentation 36 which runs continuously around the lid adjacent to skirt 30. The indentation is sized to accept the rolled edge 20 in locking interengagement, as seen in partial cross-section in FIG. 3.

Figure 4:
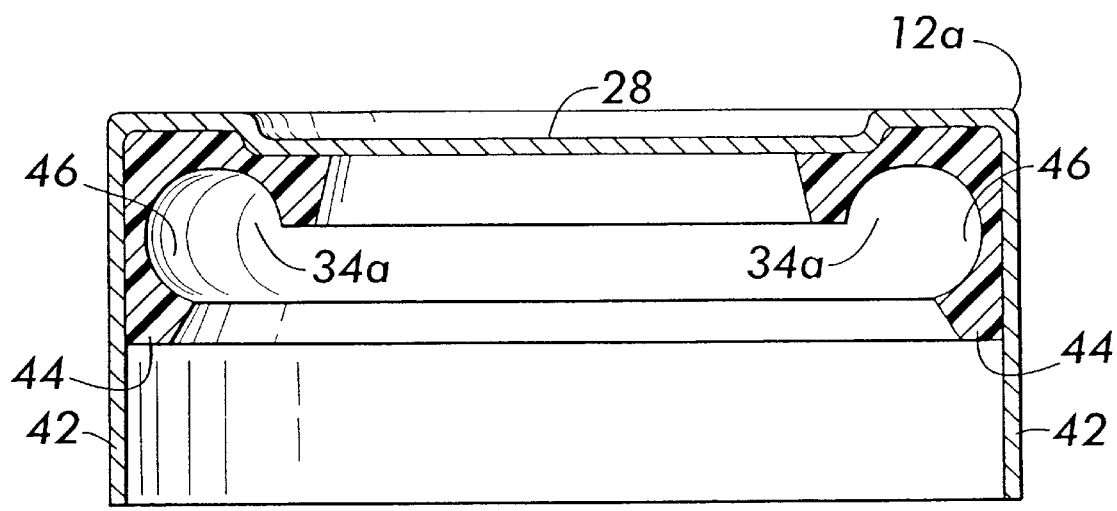
FIG. 4 is a cross-sectional view of an alternate embodiment of a lid according to the invention.

FIG. 4, wherein the same numbers are used to denote the same parts as in FIG. 2, shows an alternate embodiment of the lid 12, denoted 12a. In FIG. 4, lid 12a includes a paperboard central panel 28 which is extended downwardly around the perimeter of the central panel to form a paperboard skirt 42 surrounding the lid. This alternate embodiment is used when it is desired to have graphics imprinted over the entire outer surface. A resilient plastic reinforcing ring 44 is located within the lid contiguous with both the skirt 42 and the central panel 28. Ring 44 extends substantially continuously around the lid and has an indentation 46 shaped to accept the rolled edge 20 of the container in locking interengagement, analogous to indentation 36, seen in FIG. 2. Both the indentation 46 and the indentation 36 provide a means for reclosing the lid as explained below.

Lid 12 and its alternate embodiment 12a are preferably formed by an injection molding process using a cavity and core mold. A paperboard blank comprising the paperboard central panel 28 and the paperboard skirt 42 (when present) is placed in the mold cavity and the core portion is interfitted into the cavity, folding the blank substantially to its final shape. Molten plastic resin, for example, polyethylene, is then injected into the mold forming the skirt 30 or the reinforcing ring 44 as appropriate. The paperboard has a surface which is compatible with the injected plastic, the injected plastic fusing to the surface as it cures to secure the paper component to the plastic component.

Figure 3:
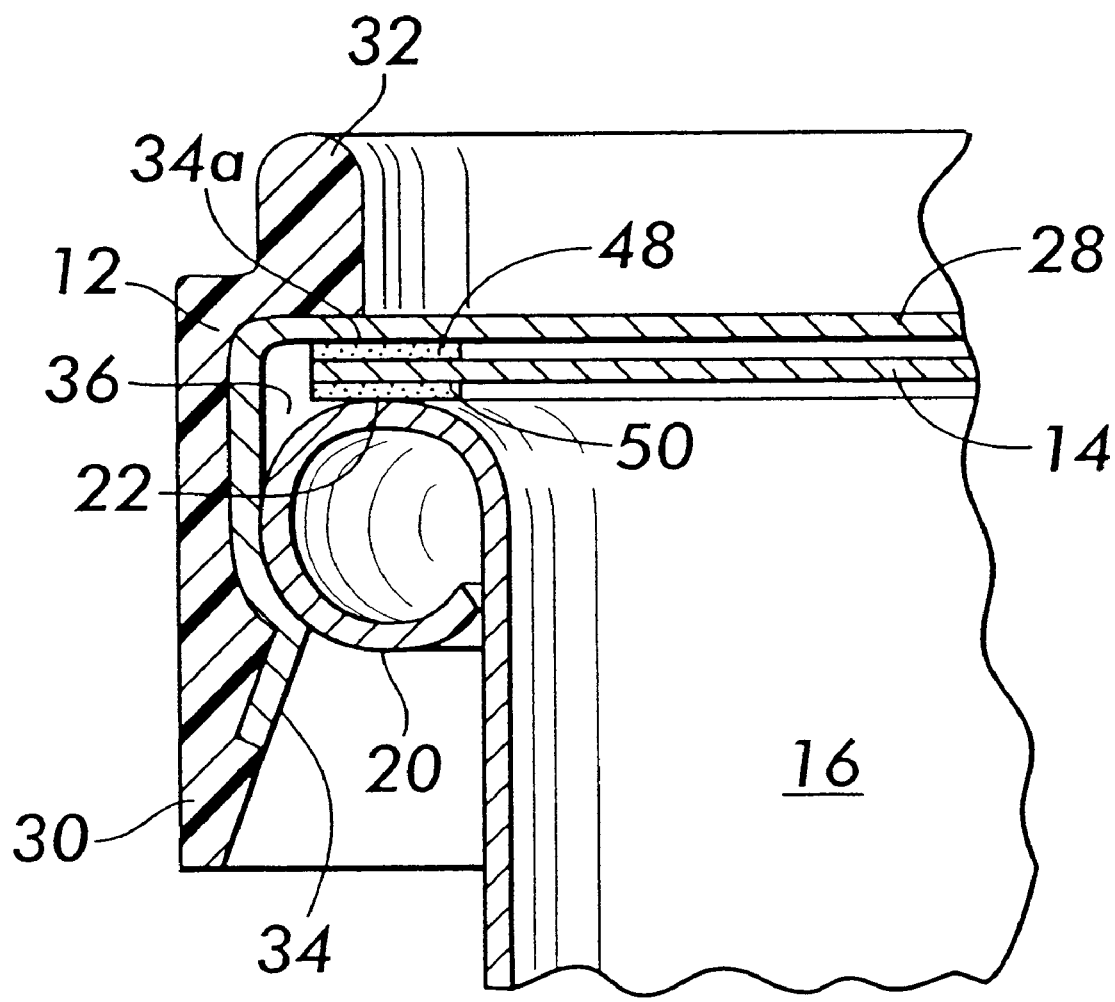
FIG. 3 is a partial cross-sectional view taken along line 3—3 of FIG. 1 but showing the container as assembled from the exploded view.

Attachment of the lid 12 to the container 16 is effected by means of adhesives, preferably heat activated coatings on the membrane 14. As seen in FIG. 3, membrane 14 has heat activated coatings 48 and 50 on its upper and lower surfaces respectively. (All thicknesses are shown exaggerated in size for clarity of illustration.) Coatings 48 and 50 are coated onto the membrane 14 and comprise either a coating such as polyethylene applied over the entire surface or a desired pattern such as a heat-activated adhesive, as illustrated in coatings 48 and 50. Contact area 22 and inside surface 34a on the central panel 28 comprise surfaces which are compatible with and will readily adhere to the heat activated coatings. For example, if coatings 48 and 50 are polyethylene, then it is preferred to also coat the inside surface 34a and at least contact area 22 with a polyethylene layer which will fuse with coatings 48 and 50 to form the attachment of the lid 12 to the container 16 when the membrane is heated. While the coatings can be applied over the entire surface of the membrane 14, it is sometimes more economic to apply them in a limited region around the perimeter 29 of the membrane, as seen in FIGS. 1, 3 and 5.

The membrane 14 is sandwiched between lid 12 and contact area 22 of container 16 as suggested in FIG. 1 and shown in detail in FIG. 3, and the coatings are heated to fix the membrane 14 to both the lid 12 and the container 16, thus, attaching the lid to the container as well. Using the membrane to effect the lid attachment provides an economical hermetic seal which avoids the use of hot melt adhesives and their associated costs and disadvantages of contamination of the container contents.

The preferred method of assembling the lid is illustrated in FIG. 5. Lids 12, made by the injection molding process described above, are carried on a conveyor (not shown) in a direction indicated by arrow 52 beneath a punch press 54 to which is fed a web of membrane material 56 which is preprinted with the heat activated coatings 48 and 50. The punch press punches out membranes 14 of the appropriate size and shape from the web material, the membranes falling into the underlying lids 12. It is often advantageous to attach the membrane 14 to the lid 12 by adhesive 55 applied between the membrane 14 and the central panel 28 along a hinge 64 described in detail below. This ensures that the membrane remains with the lid during shipment of the lids. The lids are then shipped to a plant wherein the containers are packed with their contents. At the plant the lids are placed onto respective containers 16 after filling and heated using induction to activate the coatings and fix the lids to the containers.

Figure 6:
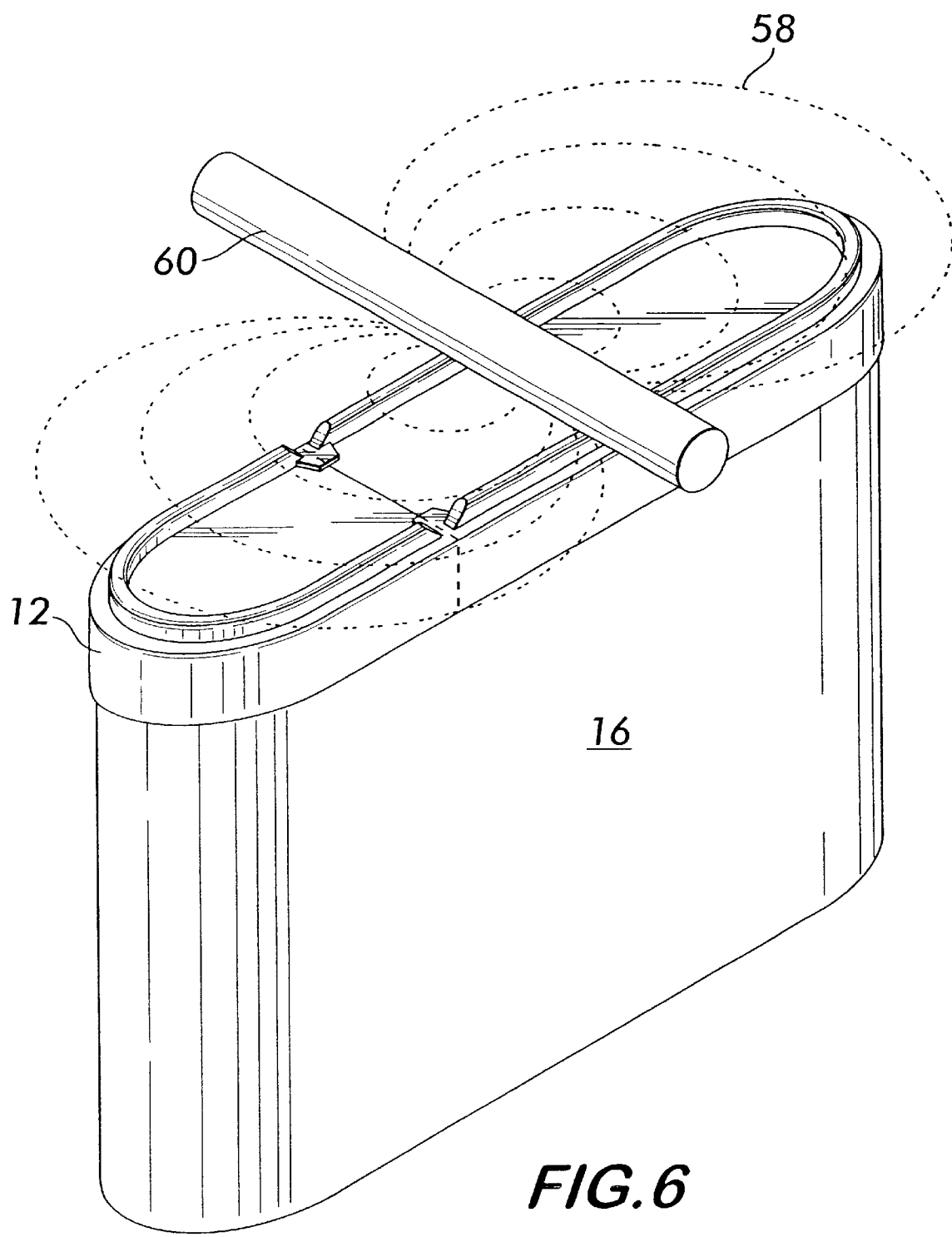
FIG. 6 is a schematic perspective view of a machine used to assemble containers having lids according to the invention.

Preferably, the membranes 14 are formed from a metal foil, such as aluminum, which allows the coatings to be inductively heated as illustrated in FIG. 6. The lids 12 on the containers 16 are passed within the electro-magnetic field 58 of an induction coil 60. Field 58 induces eddy currents in the foil membrane which heat the membrane, and hence, the coatings 48 and 50, causing them to fuse to the compatible surfaces 34a of the lid and the contact area 22 of the container 16 (see FIG. 3). A compressive force is also applied to the lid to provide for continuous contact of the membrane with the contact area thus ensuring a hermetic seal.

Figure 7:
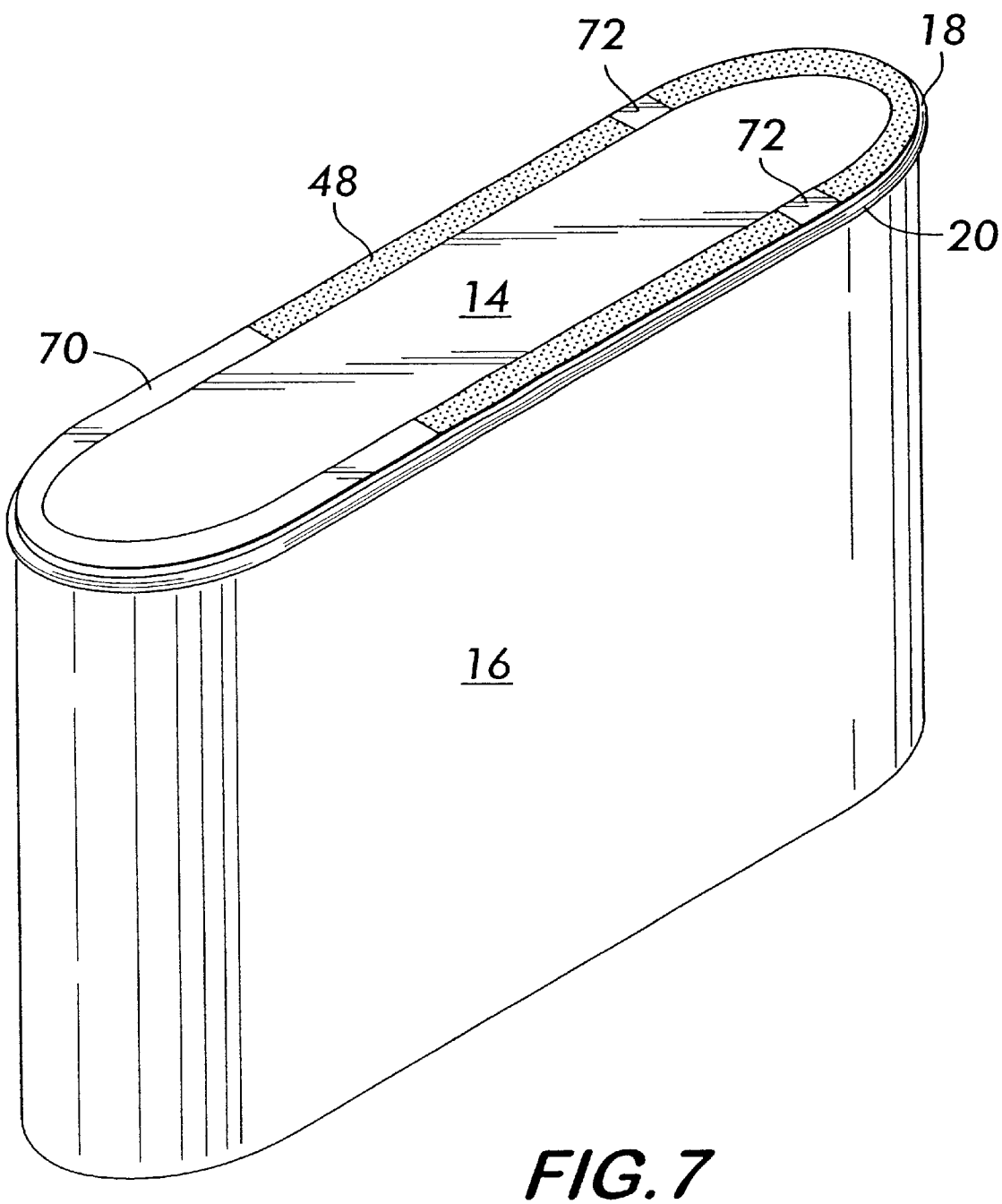
FIG. 7 is a perspective view illustrating a container without a lid.

In an alternate assembly method shown in FIG. 7, the membrane 14 is tacked into place on the container 16 using the coating 50 on the lower surface of the membrane and the compatible surface of the contact area 22 of the container 16. The lid 12 is then snapped over the rolled edged 20 and induction heat and compressive force are applied to effect the attachment.

Lid 12 has a fixed portion 60 and a movable portion 62 which is hingedly attached to the fixed portion at a hinge 64, best seen in FIG. 1. Hinge 64 comprises a score line or crease which extends transversely across the paperboard central panel 28 which permits the rotation of movable portion 62.

Figure 8:
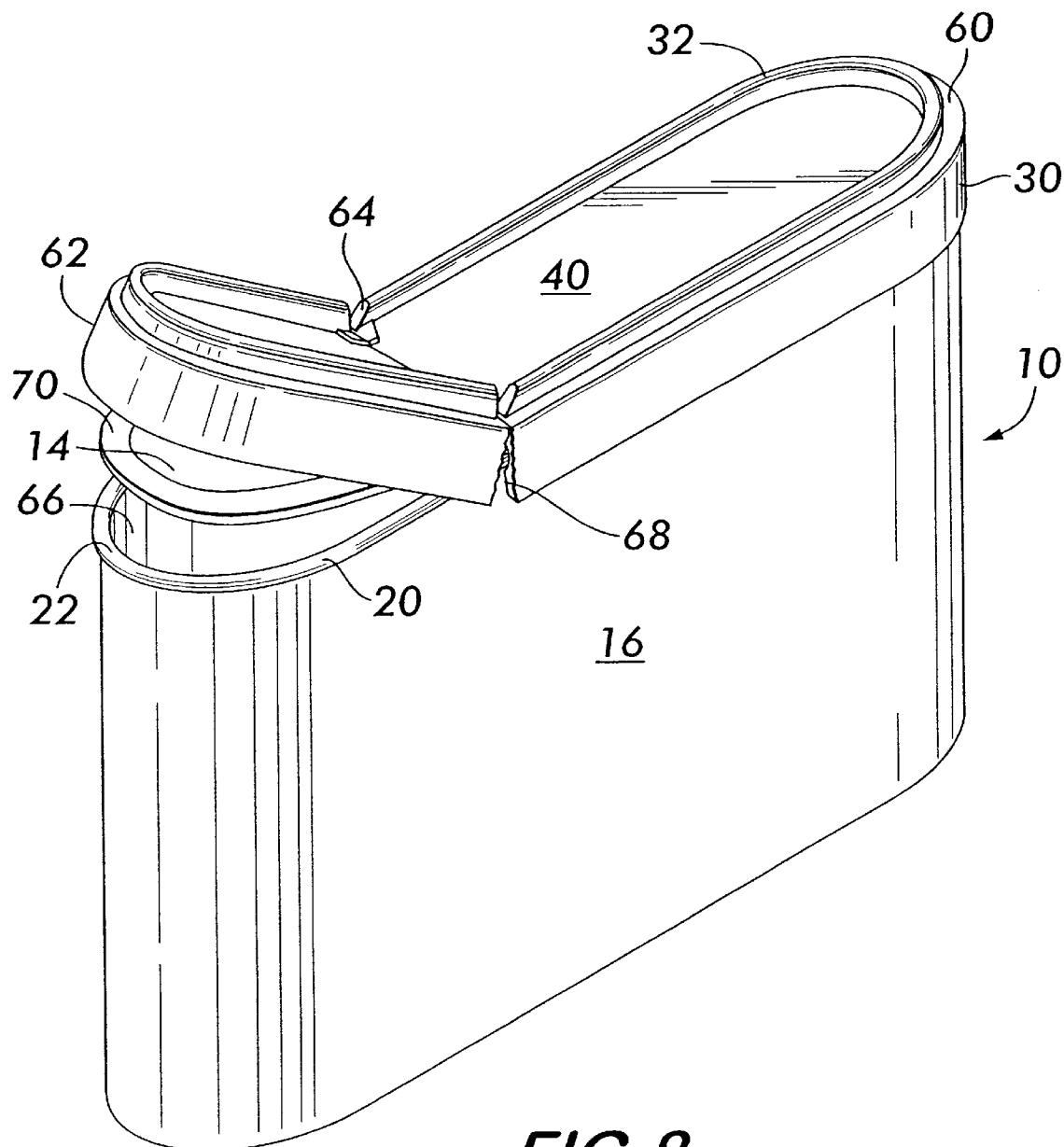
FIG. 8 is a perspective view of a container having a lid according to the invention, the lid being in the open position.

As seen in FIG. 8, to initially open the container assembly 10, movable portion 62 of lid 12 is rotated about hinge 64 to expose membrane 14 which is in turn partially separated from contact area 22 to expose a pour opening 66 beneath movable portion 62. To allow movable portion 62 to rotate freely, the skirt 30 has weakened regions 68 extending across the skirt from the hinge 64 on both sides of the lid. The weakened regions are formed, for example, by scoring or perforating the skirt, or by reducing the thickness of the skirt at the region to be weakened. The skirt naturally separates at the weakened regions when movable portion 62 is rotated to open the container, as seen in FIG. 8. The skirt thus provides a tamper evident feature, as it will be immediately visually apparent if the skirt has separated at the weakened regions, indicating that the container was opened and its contents possibly corrupted.

Figure 9:
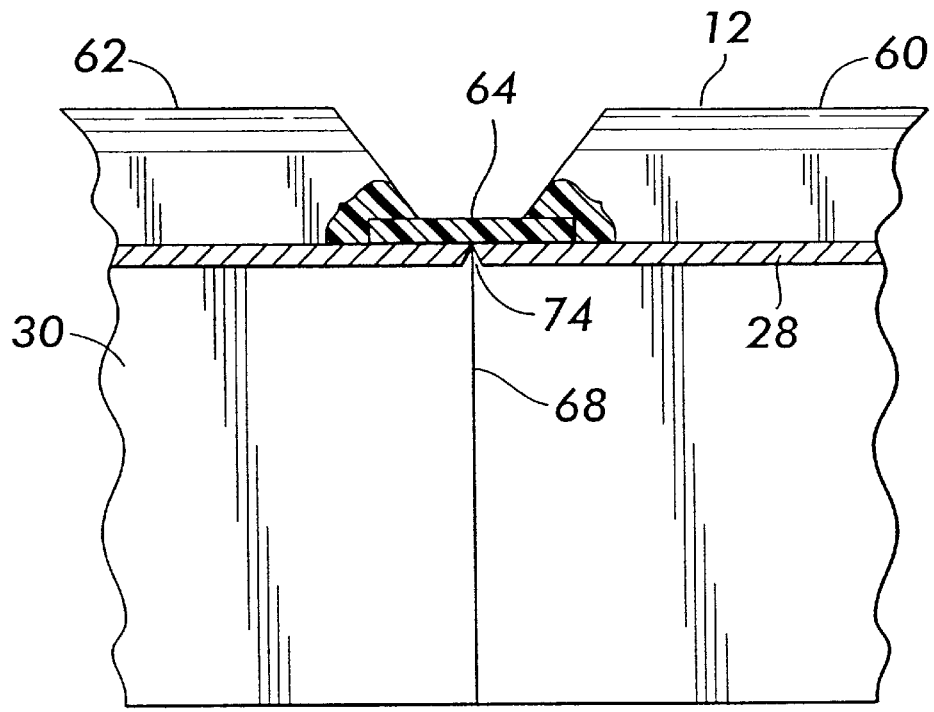
FIG. 9 is a partial sectional view taken along line 9—9 of FIG. 1.
Figure 10:
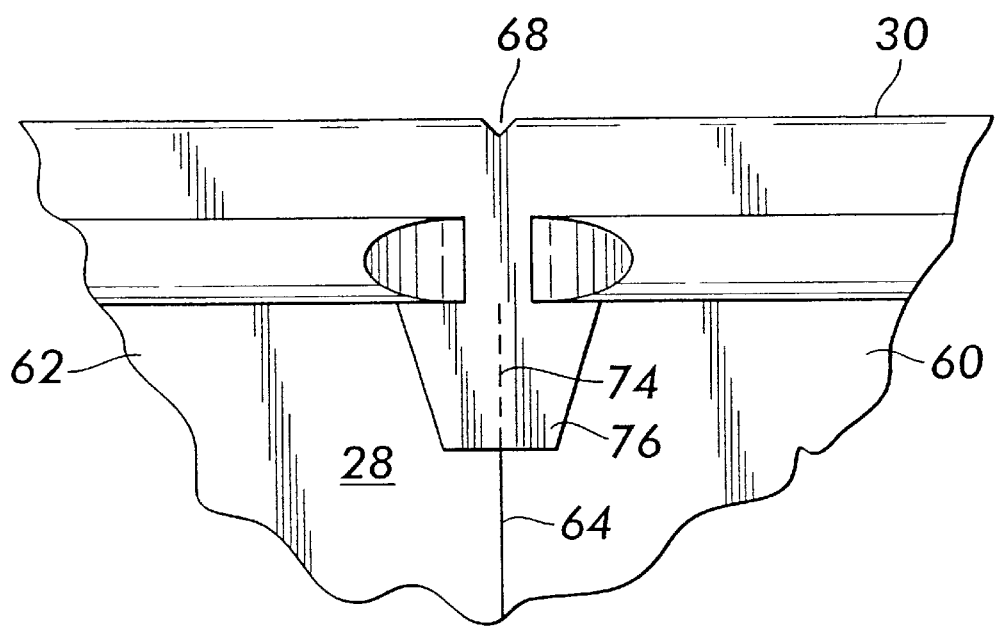
FIG. 10 is a top plan view of the partial sectional view shown in FIG. 9.

FIG. 9 presents a detailed view of hinge 64 taken along line 9—9 of FIG. 1 and shows an elongated cut 74 through central panel 28. As best shown in FIG. 10 (which is a top view of FIG. 9), cut 74 is made lengthwise along and coincident with hinge 64 in a region adjacent to the weakened region 68 of skirt 30. A similar cut (not shown) is positioned on the opposite side of the lid 12 adjacent the other weakened region 68. The cuts 74 allow for easier bending of the central panel 28 along hinge 64 and thereby facilitate pivoting of the movable portion 62 of the lid relatively to the fixed portion 60. Tabs 76, one of which is shown in detail in FIG. 10, are positioned over each of the cuts 74 respectively to seal the central panel 28. Preferably, the tabs 76 are integrally formed with skirt 30 and are comprised of the same material, such as plastic resin.

Figure 11:
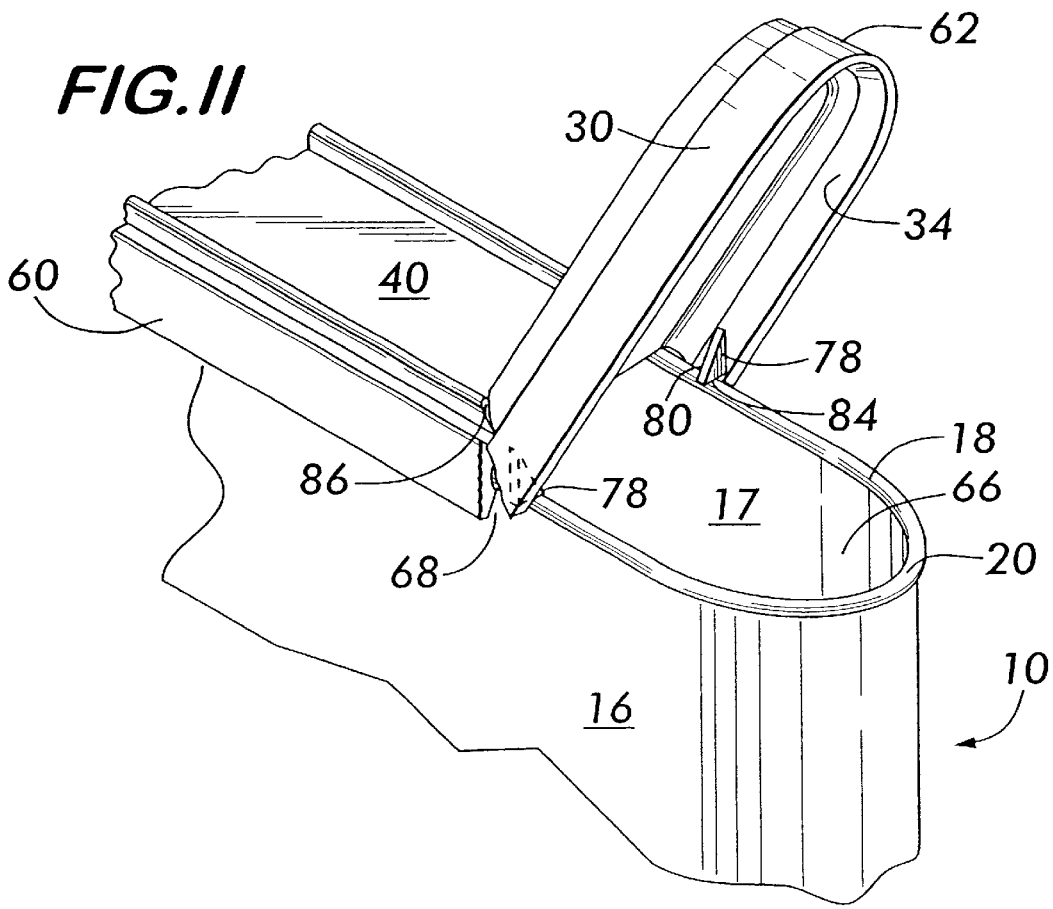
FIG. 11 is a partial perspective view of a container according to the invention, the lid shown in the open position.

It is often convenient for the lid to remain in the open position shown in FIG. 8 to allow the container contents to be poured out through pour opening 66 while the container is held in one hand without having to hold the lid open with the other hand. As shown in FIG. 11, one or more detents 78 are provided to hold the movable lid portion 62 in the open position. Detents 78 project from the inside surface 34 of skirt 30 and cooperate with the rim 18, in this embodiment, rolled edge 20, to hold the movable lid portion 62 pivoted in the open position relatively to the fixed lid portion 60. As shown in detail in FIG. 11, the preferred embodiment of the detent 78 has a wedge shape defining an inclined surface 80 facing the sidewall 17 of the container body 16 and an end surface 84 positioned to engage the rim 18. When the movable lid portion 62 is pivoted, inclined surface 80 of detent 78 engages the rim 18 and skirt 30 is pushed resiliently and elastically outward away from the container due to the wedge shape of the detent. Rim 18 is mutually deflected inwardly toward the center of the container. After the end surface 84 clears the rim 18 the skirt 30, being resilient, moves back toward the container and biases the end surface 84 into engagement with the rim. The detent thereby cooperates with the rim to hold the movable lid portion 62 in the open position shown in FIG. 11. Reclosure of the lid is effected simply by pressing downwardly on the movable lid portion, the resilient skirt 30 giving way outwardly, the rim deflecting inwardly and allowing the detent to disengage from the rim to close the container.

Figure 12:
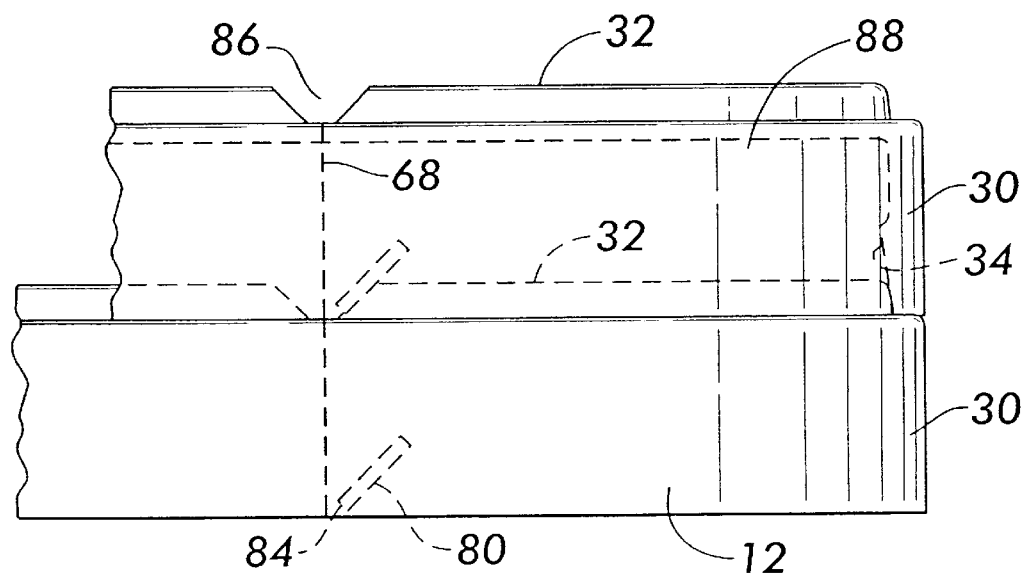
FIG. 12 shows a partial sectional view of two lids according to the invention stacked one on top of the other.

It is preferred that detents 78 are formed integrally with skirt 30 of plastic resin material and positioned adjacent to the weakened regions 68 of the skirt so as to be near to the hinge and effectively prop the movable lid portion open with a relatively small size. As seen in FIGS. 11 and 12, notches 86 are positioned in the stacking lip 32 adjacent to the weakened regions 68 of skirt 30. The notches not only permit the pivoting motion of the movable lid portion 62, they are sized and shaped to accept the detents 78 of another identical lid 88 in a nested configuration when the lids are stacked one atop the other as shown in FIG. 12.

While it is desirable to attach the membrane 14 continuously to the container over the contact area 22 to effect the hermetic seal, it is preferred not to attach the membrane continuously to the lid. Preferably, the lid 12 is attached to the membrane 14 only over the fixed portion 60, the movable portion 62 remaining unattached to allow it to be rotated without undue force and without disturbing the membrane 14.

The partial attachment of the lid to the membrane described above is accomplished by selectively coating the membrane with a pattern seal resist laquer or varnish 70, best illustrated in FIG. 1. The seal resist can be printed onto the foil on top of the coating 48 in a pattern matched to the shape of the movable portion 62 of the lid. When the lid is inductively heated (FIG. 6), the seal resist 70 prevents the heat activated coating 48 beneath it from fusing with the inside surface 34a of the central panel 28 facing the movable portion 62 of the lid. In regions underneath the fixed portion 60 of the lid, there is no seal resist coating so the heat activated coatings fuse with the lid inside surface to effect the attachment of the lid to the membrane and the container 16. It is sometimes useful to have minor areas of seal resist 72 on the membrane 14 beneath the fixed portion 60 of the lid, as seen in FIG. 1. The presence of such minor areas does not significantly affect the attachment of the lid 12 to the container but provides convenient locations where heat can be applied selectively to tack the membrane in place on the container, as illustrated in FIG. 7. Contact heating elements can be applied to the seal resist layers 72 and at similar isolated points on seal resist layer 70 to temporarily but securely fix membrane 14 to the container 16 as described above without having part of the coating 48 adhering to the contact heating elements.

Once opened, the lid 12 is reclosable by pushing the movable portion 62 downwardly over the rolled edge 20. The rolled edge is resiliently deflected by the movable lid portion and engages the indentation 36 to releasably secure the movable portion 62 in a closed position over pour opening 66, an example of the engagement between the rolled edge and indentation being illustrated in FIG. 3. (The indentation 46 in lid 12a behaves similarly to effect the closure of the lid.)

Container lids having a foil seal membrane attachable via inductive heating according to the invention allow tubular containers to avoid the use of hot melt adhesives applied after the container has been filled, thus, allowing such containers to compete favorably with other forms of packaging. Lids and containers using lids according to the invention are economical, robust, provide an initial hermetic seal, are reclosable and provide obvious evidence of potential tampering, thus, augmenting the range of choices available for the efficient and convenient packaging of bulk goods.

What is claimed is:

1. A lid for a container having a sidewall with a rim defining an opening into the container, said lid being engageable with the rim to close the opening, said lid being stackable with another substantially identical lid, said lid comprising:
    a central panel having an outer perimeter;
    a hinge extending transversely across said central panel and dividing said lid into two lid portions, one lid portion being pivotably movable about said hinge relatively to the other said lid portion;
    a resilient, flexible skirt joined to said perimeter and extending substantially perpendicularly to the plane of said central panel, said skirt having an inside surface positionable to face the container sidewall adjacent to the rim and a pair of weakened regions arranged on opposite sides of said lid, said weakened regions being aligned with said hinge and subject to failure to facilitate separation of said skirt at said hinge when said one lid portion is pivoted relatively to the other said lid portion;
    a detent positioned adjacent to one of said weakened regions and projecting substantially perpendicularly from said inside surface of said skirt on said one lid portion, said detent being resiliently biasable into engagement with the rim by said skirt and, when said lid is engaged with the rim, said detent cooperating with the rim to hold said one lid portion in a pivoted position relatively to the other said lid portion thereby exposing the opening in the container; and
    a stacking lip joined to said perimeter of said central panel and extending substantially perpendicularly to the plane of said central panel away from said skirt, said lip being engageable with the inside surface of the skirt on the other substantially identical lid for stacking a plurality of lids one atop another, said lid having a notch aligned with said hinge and sized to receive a detent on the other substantially identical lid.

2. A lid according to claim 1, wherein said detent has a wedge shape defining an inclined surface positionable to face the sidewall and an end surface positionable to engage the rim, said inclined surface being engageable with the rim to force said skirt outwardly away from the sidewall when said lid is engaged with the rim and said one lid portion is pivoted, said end surface being resiliently biasable by said skirt into engagement with the rim after said one lid portion is pivoted.

3. A lid according to claim 1, wherein said stacking lip is integrally formed with said skirt.

4. A lid according to claim 1, further comprising two elongated cuts through said central panel positioned coincident with and along said hinge, each cut being positioned adjacent a respective weakened region for facilitating pivoting of said one lid portion.

5. A lid according to claim 4, further comprising two elongated tabs, each one being attached to said central panel and covering one of said elongated cuts for sealing said central panel.

6. A lid according to claim 5, wherein said elongated tabs are integrally formed with said skirt.

7. A lid according to claim 1, wherein said central panel comprises paperboard and said skirt comprises plastic resin.

8. A lid according to claim 1, further comprising a membrane overlying said central panel adjacent to said inside surface of said skirt, said membrane being positionable in overlying registration with the opening and attachable to the rim for sealing the container opening.

9. A lid according to claim 8, wherein said membrane is attached to said central panel at a point along said hinge.

10. A lid according to claim 8, wherein said membrane comprises a metal foil.

11. A lid according to claim 10, wherein said membrane has a first heat activated adhesive layer on a first side thereof, said first side being positionable to face the rim, said first adhesive layer being engageable with the rim to attach said membrane to the rim and thereby enclose the opening when said lid is engaged with the rim.

12. A lid according to claim 11, wherein said membrane has a second heat activated adhesive layer on a second side of said membrane opposite to said first side, said second adhesive layer being positioned to engage said other lid portion for attaching said lid to the rim when said lid is engaged with the rim.

13. A container comprising:
- a sidewall defining an interior space and an opening providing access to said space;
- a rim surrounding said opening;
- a lid engaged with said rim in overlying registration with said opening, said lid comprising:
  - a central panel having an outer perimeter;
  - a hinge extending transversely across said central panel and dividing said lid into two lid portions, one lid portion being pivotably movable about said hinge relatively to the other lid portion into an open position away from said opening;
  - a resilient, flexible skirt joined to said perimeter and extending substantially perpendicularly to the plane of said central panel, said skirt having an inside surface positioned facing said sidewall adjacent to said rim and a pair of weakened regions arranged on opposite sides of said lid, said weakened regions being aligned with said hinge and subject to failure to facilitate separation of said skirt at said hinge when said one lid portion is pivoted relatively to the other lid portion, said weakened regions providing a readily visible indication of potential tampering with said container;
  - a detent positioned adjacent to one of said weakened regions and projecting substantially perpendicularly from said inside surface of said skirt on said one lid portion, said detent being resiliently biased into engagement with said rim by said skirt when said one lid portion is pivoted into said open position, said detent cooperating with said rim to hold said one lid portion in said open position; and
  - a stacking lip joined to said perimeter of said central panel and extending substantially perpendicularly to the plane of said central panel away from said skirt, said lip being engageable with an inside surface of a skirt on another substantially identical lid for stacking lids one atop another, said lid having a notch aligned with said hinge and sized to receive a detent on another substantially identical lid.

14. A container according to claim 13, further comprising a membrane positioned between said lid and said rim in overlying registration with said opening, said membrane being attached to said rim thereby sealing said opening.

15. A container according to claim 14, further comprising a first adhesive layer positioned between said membrane and said rim for adhesively attaching said membrane to said rim.

16. A container according to claim 15, further comprising a second adhesive layer positioned between said membrane and said other lid portion for adhesively attaching said membrane to said lid, and thereby attaching said lid to said container.

17. A container according to claim 16, wherein said membrane is a metal foil and said first and second adhesive layers comprises a heat activated resin.

18. A container according to claim 17, wherein said heat activated resin comprises polyethylene.

19. A lid for a container having a sidewall with a rim defining an opening into the container, said lid being engageable with the rim to close said opening, the lid comprising:
- a central panel having an outer perimeter;
- a hinge extending transversely across said central panel and dividing said lid into two lid portions, one lid portion being pivotably movable about said hinge relatively to the other said lid portion;
- a resilient, flexible skirt joined to said perimeter and extending substantially perpendicularly to the plane of said central panel, said skirt having an inside surface positionable to face the container sidewall adjacent to the rim and a pair of weakened regions arranged on opposite sides of said lid, said weakened regions being aligned with said hinge and subject to failure to facilitate separation of said skirt at said hinge when said one lid portion is pivoted relatively to the other said lid portion, two elongated cuts through said central panel being positioned coincident with and along said hinge, each of said cuts being positioned adjacent to a respective weakened region for facilitating pivoting of said one lid portion; and
- a detent projecting substantially perpendicularly from said inside surface of said skirt on one lid portion, said detent being resiliently biasable into engagement with the rim by said skirt and, when said lid is engaged with the rim, said detent cooperating with said rim to hold said one lid portion in a pivoted position relatively to the other said lid portion thereby exposing the opening in the container.

* * * * *